US007315389B2

(12) United States Patent
Kuwata et al.

(10) Patent No.: US 7,315,389 B2
(45) Date of Patent: Jan. 1, 2008

(54) ELECTRONIC DOCUMENT ASSEMBLY, PROOFING AND PRINTING SYSTEM

(75) Inventors: Katie Kuwata, Oceanside, CA (US); Truc Nguyen, San Diego, CA (US); Louis Ormond, Irvine, CA (US)

(73) Assignee: Toshiba Tec Kabushiki Kaisha (JP)

( * ) Notice: Subject to any disclaimer, the term of this patent is extended or adjusted under 35 U.S.C. 154(b) by 769 days.

(21) Appl. No.: 10/105,642

(22) Filed: Mar. 25, 2002

(65) Prior Publication Data
US 2003/0072031 A1   Apr. 17, 2003

Related U.S. Application Data

(60) Provisional application No. 60/278,180, filed on Mar. 23, 2001.

(51) Int. Cl.
G06F 3/12 (2006.01)
H04N 1/387 (2006.01)
H04N 1/46 (2006.01)

(52) U.S. Cl. ............... 358/1.15; 358/452; 358/501; 358/538

(58) Field of Classification Search ........... 358/1.15, 358/1.16, 403, 401; 705/27; 379/100.01; 709/203
See application file for complete search history.

(56) References Cited

U.S. PATENT DOCUMENTS 6,424,429 B1 * 7/2002 Takahashi et al. ......... 358/1.16

6,493,677 B1 * 12/2002 von Rosen et al. ........... 705/27
6,947,182 B1 * 9/2005 Kumagai .................. 358/402
6,965,440 B1 * 11/2005 Nakagiri et al. .......... 358/1.12
7,051,073 B1 * 5/2006 Dutta ........................ 709/206

FOREIGN PATENT DOCUMENTS

| EP | 0 601 704 A1 | 6/1994 |
| EP | 1 043 656 A2 | 10/2000 |
| EP | 1 043 656 A3 | 10/2000 |
| JP | 2000022880 A * | 1/2000 |
| WO | WO 01/04749 A1 | 1/2001 |
| WO | WO 01/93577 A2 | 12/2001 |
| WO | WO 01/93577 A3 | 12/2001 |

OTHER PUBLICATIONS

XP-002345589, Digital Signature Standard [DDS], U.S. Deparment of Commerce/National Institute of Standards and Technology. Jan. 27, 2000.

* cited by examiner

Primary Examiner—Douglas Q. Tran
Assistant Examiner—Thomas J. Lett
(74) Attorney, Agent, or Firm—Tucker Ellis & West LLP

(57) ABSTRACT

The present invention is for a system that allows images to be managed and manipulated on a server by using a web browser. Images may be scanned, printed, faxed, copied, viewed, merged, edited or electronically manipulated across a network, such as the Internet or an Intranet. The server has security that controls access to files, folders and functions.

16 Claims, 16 Drawing Sheets

| Column Name | Data Type | Comment |
|---|---|---|
| User ID | Numeric | Unique number & auto-generated |
| Username | Text | User Name (Unique) |
| Password | Text | Encrypted |
| Email | Text | Email address |
| Description | Text | Free style comments |
| User Type | Numeric | (Admin/User) |
| Folder Path | Text | Physical folder path |
| Language | Numeric | See 5.2.2.3 |
| Time Out | Numeric | Time out in seconds |

Figure 4

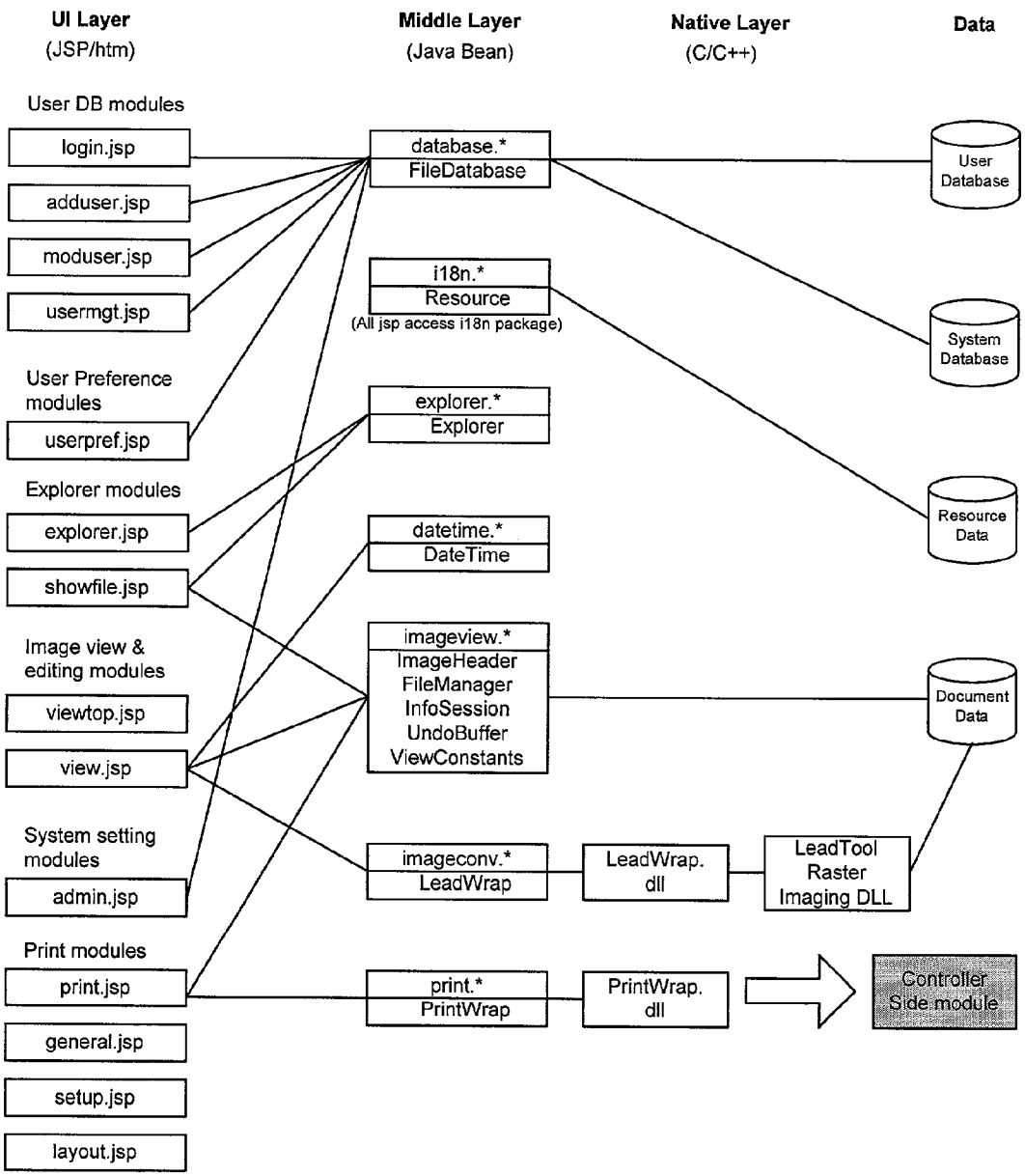
Figure 8

User Name : katie
Password : ******

[Login]  [Register]  [Cancel]

Figure 12

Create your own Proof Buddy Account

User Name: mary
Password: ******
Confirm Password: ******
Description: TABS
E-Mail Address: mary@email.com

[OK]  [Cancel]

Figure 13

| File | Edit | View | Image | Send |
|---|---|---|---|---|
| New Folder | Undo <action> | List | Erase Margins… | Fax |
| *Folder Properties | | •Thumbnail | Remove Noise | Email |
| ----- | Select All Pages | Large Thumbnail | Remove Hole punch | Print |
| Save | Invert Page Selection | Actual Size | Remove Header/Footer | |
| Save As… | --- | ----- | ---- | |
| ---- | *Move To… | √ Ruler | Crop… | |
| Print | *Copy To… | --- | ----- | |
| ----- | --- | Beginning | Invert Colors | |
| Properties | *Change Page Position… | Previous | ----- | |
| | Renumber Document… | Next | Rotate 90 | |
| | Insert Blank Sheet… | End | Rotate 180 | |
| | --- | | Rotate 270 | |
| | *Rename <folder/document> | | Flip Horizontal | |
| | --- | | Flip Vertical | |
| | *Delete | | Skew… | |

* Disabled until certain item is selected

Figure 14

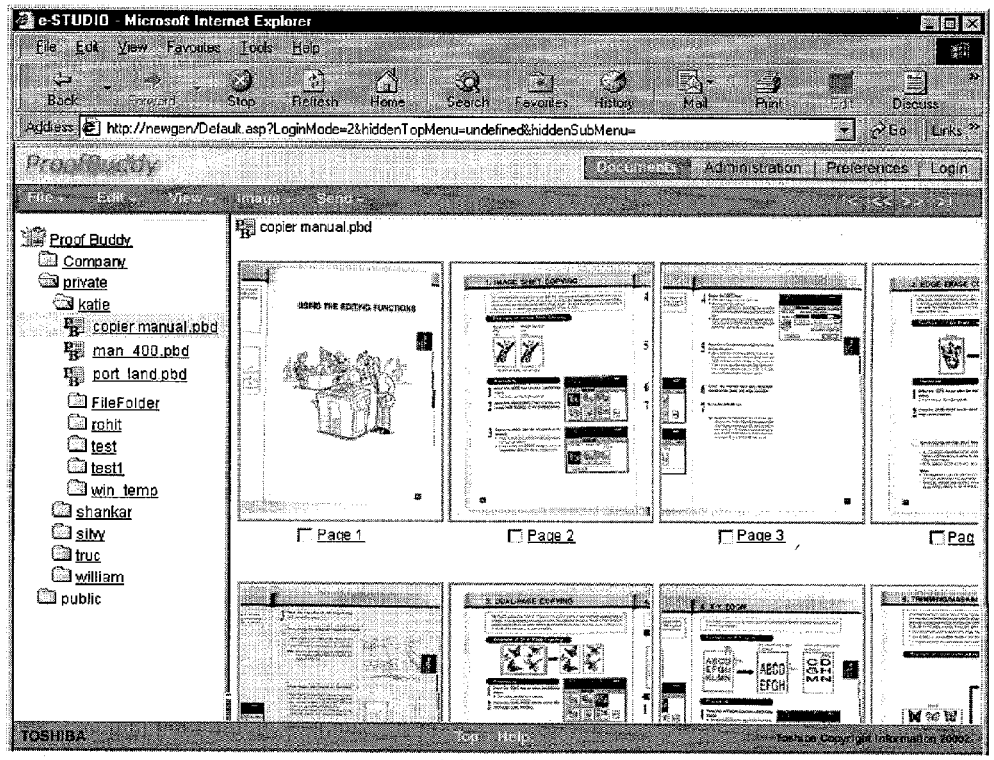

Figure 15

| User Type | Read Access | Write Access |
|---|---|---|
| Non-Registered User | PUBLIC folder<br>DEPARTMENT folder | PUBLIC folder |
| Registered User | PUBLIC folder<br>DEPARTMENT folder<br>Own private folder | PUBLIC folder<br>Own private folder |
| Administrator | Any folder | Any folder |

| User Type | Current Opened Folder | Visible/Not Visible |
|---|---|---|
| Administrator | Any Folder | Visible |
| Registered User | Public Folder | Visible |
| Registered User | DEPARTMENT Folder | Visible |
| Registered User | Own Private Folder | Visible |
| Registered User | Other Private Folders | Not Visible |
| Non-Registered User | Public Folder | Visible |
| Non-Registered User | DEPARTMENT Folder | Not Visible |
| Non-Registered User | Private Folders | Not Visible |

Figure 17g

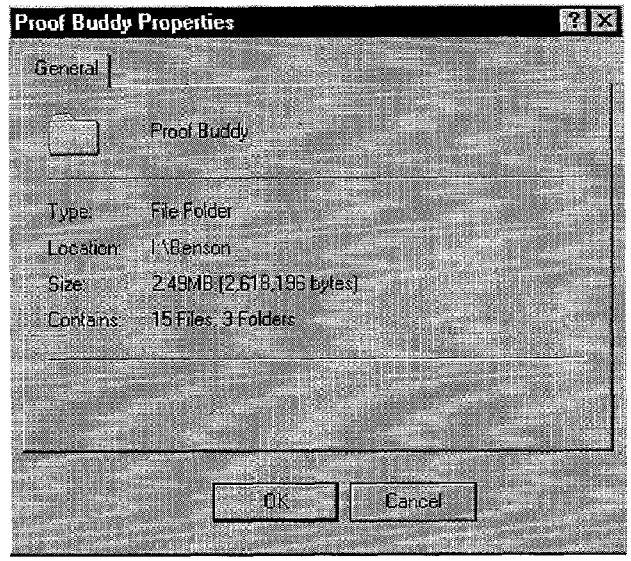

Figure 17h

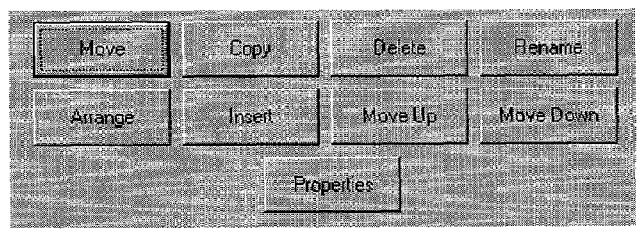

Figure 18

Figure 19

Figure 20

| Control | Choices | Comment | Default |
|---|---|---|---|
| Language [Drop Down List] | US English, UK English, French, German, Swedish, Norwegian, Finnish, Danish, Dutch, Spanish, Italian, Czech, Polish, Japanese | | English |
| Initial View [Drop Down List] | Thumbnail view, Full Page view Readable view, File List view | This selection specifies the initial view setting when Proof Buddy is invoked. | Thumbnail |
| Login Timeout Period [Drop Down List] | Value between 5 to 120 minutes in 1-minute increment. This value specifies the interval during which if there is no activity from the user, the user is automatically logged out. | | 20 minutes |
| Save [Button] | Click to save current settings | | |
| Reset [Button] | Click to refresh the page with previously stored settings | | |

Figure 21

| Control | Choices | Comment | Default |
|---|---|---|---|
| Number of items to show per screen | User enters a number between 1 and 1000 | | 100 |
| Maximum Number of Active Users | A number between 1 and 10 | | 10 |
| Default Storage Path for DEPARTMENT folders | User enters a full path name | | TBD |
| Default Storage Path for Public folders | User enters a full path name | | TBD |
| Default Storage Path for Private folders | User enters a full path | | TBD |
| Save [Button] | Click to save current settings | | |
| Reset [Button] | Click to refresh the page with previously stored settings | | |

Figure 22

ELECTRONIC DOCUMENT ASSEMBLY, PROOFING AND PRINTING SYSTEM

CROSS-REFERENCE TO RELATED APPLICATIONS

The present application claims the benefit of U.S. Provisional Application No. 60/278,180, filed Mar. 23, 2001.

BACKGROUND OF THE INVENTION

The present invention relates to the field of document organizing systems, specifically to the field of electronic document assembly, proofing and printing systems that are client/server based, accessible across a network, preferably the Internet, by utilizing a web browser, and does not require a client system to install application programs or printer drivers at the client site.

The modern office often receives and must send documents by various methods. Documents may be sent or received by e-mail, fax, or hardcopy. It may be desired that a document be edited or combined with another document and be re-transmitted or sent back to another person. The combination of documents may not have been received by the same method, for example some pages may have been received by fax, others by e-mail, and still others by hardcopy. This creates complications for users that receive inputs from a combination of sources.

In outputting documents it may be desired that the document be sent to a multiplicity of recipients via a plurality of methods. It may be desired to simultaneously print a hard copy, fax and e-mail a document. However, most typical systems do not produce a variety of outputs.

It often desired that document assembly and proofing be accomplished by a variety of users. Thus a shared system is desired which allows users to manipulate a document. Additionally it may be desired that some security is available to prevent unauthorized users, either via the network or from a user interface at the device.

Many devices that are accessible over a network require drivers or other software on a client computer in order to utilize the device's services. Often this required software will conflict with other applications installed on the client and cause problems. Furthermore, the application software consumes client resources. Finally, most application software is operating system or platform dependent. Thus, there is a need for a platform independent solution that will minimize conflicts with other application software residing on the client system and operate on a network with clients utilizing various operating systems.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

SUMMARY OF THE INVENTION

In view of the aforementioned difficulties and drawbacks with previous type systems, the invention contemplates a client server based system wherein the server is accessible by the client across a network, preferably the Internet, utilizing a browser. The client computer may send print jobs to the server through the browser and is not required to have a printer driver installed on the client. The server may also receive input from faxes or file transfers from the client via the browser. Additionally, the server may also function as a document scanner. Documents may be stored on the server which can be viewed, edited, copied, moved, renamed or deleted by the client utilizing a browser. The client may print or fax documents from the server through the browser.

The present invention may further comprise tiered access security. Administrators may be given system wide access, users a more restricted access and unregistered users may be given even less access. The system also contemplates using public and private folders for controlling access to the documents stored on the server.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF THE DRAWINGS

FIG. 4 is a table with a description of fields for a user database in the preferred embodiment of the present invention;

FIG. 8 is a block diagram showing the various modules and the relationships between the modules as contemplated by the present invention.

FIG. 12 is an alternative sample login screen view which also permits a user to register to use the system of the present invention;

FIG. 13 is a sample screen view of a screen used to create or edit an account with the system of the present invention;

FIG. 14 is a sample screen menu with a toolbar and buttons for accessing the functions that are available with the present invention;

FIG. 15 is an example of an explorer view display of the present invention;

FIG. 17g is a table of user rights to various folders based on user type as contemplated by the present invention;

FIG. 17h is an example of a Properties display screen contemplated by the present invention;

FIG. 18 is an example of a toolbar listing the various Image/Document Management functions available for the present invention;

FIG. 19 is a an example of a toolbar which lists the types of image edits available as contemplated by the present invention;

FIG. 20 shows a toolbar listing the file functions available with the present invention;

FIG. 21 is a table listing customizable user preferences available with the present invention; and FIG. 22 is an example of administrator controlled parameters that affect user configurations available with the present invention.

DETAILED DESCRIPTION OF THE INVENTION

A description follows of the functional specifications of a web-based document organizer and proofing system for use with a document server, preferably of the type such as a GL-1010 sold by Toshiba America Business Solutions, Inc. The present proofing system (which may optionally be identified as "Proof Buddy") allows post-ripped images to be managed on a server (such as the aforementioned GL-1010) so that viewing, editing, merging, and storage of the pages from separate documents into a new document can be accomplished using a web browser. As an example, two separate documents originating from different native applications could be sent to the server, ripped into single page bitmap files, and stored in a designated repository on the server. By using a service platform residing in the server controller, the users can manage the page images with a web browser, split or merge the images to a new document, and configure the document for printing, faxing or sending to an email address. Documents and files may be stored, archived on the server, in a tree type folder structure similar to that of Windows Explorer.

The documents are also available for printing from the server front panel. The front panel user interface is organized to allow easy searching and locating of stored documents and is consistent with other print/scan/fax user interfaces for easy-to-use navigation. The present proofing system can also be used to store frequently used forms and documents that can be readily invoked for on-demand printing. Additionally, integration of the scanning function with the proofing system shall allow the user to combine print job and scan job documents. The image storage repository shall serve as an additional send-to location for scanned images that can be managed in the proofing system from a web browser.

Figure 1:
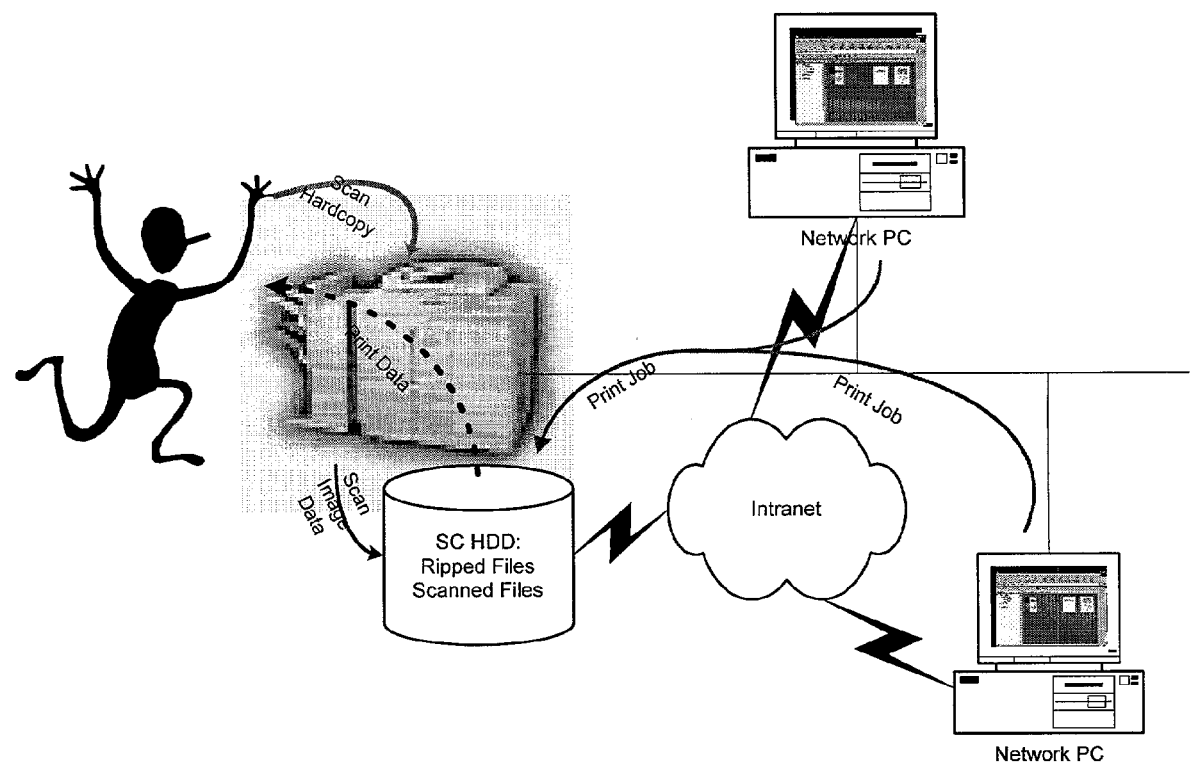
FIG. 1 is an isometric block diagram of the major hardware components of the system as contemplated by the present invention.

FIG. 1 shows the major hardware components of the system. The server which may be operated by a user utilizing the user interface on the front panel may scan or copy documents at the server. Documents may also be stored by the user on server. In addition to user access, the server is accessible through the network by PC's on the network utilizing a local Internet. Those skilled in the art will readily appreciate that the server is platform dependent and may operate on a TCP/IP network or a non-TCP/IP network. The network may either be wired or wireless.

Figure 2:
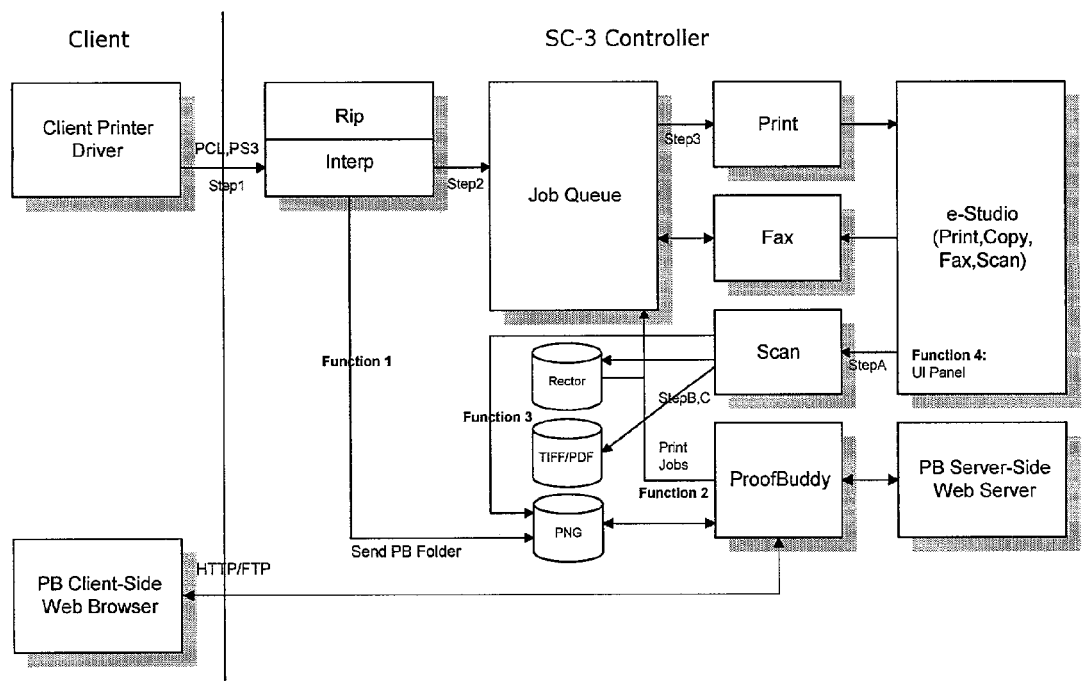
FIG. 2 is a flow diagram showing the steps utilized for the various functions of the present invention.
Figure 3:
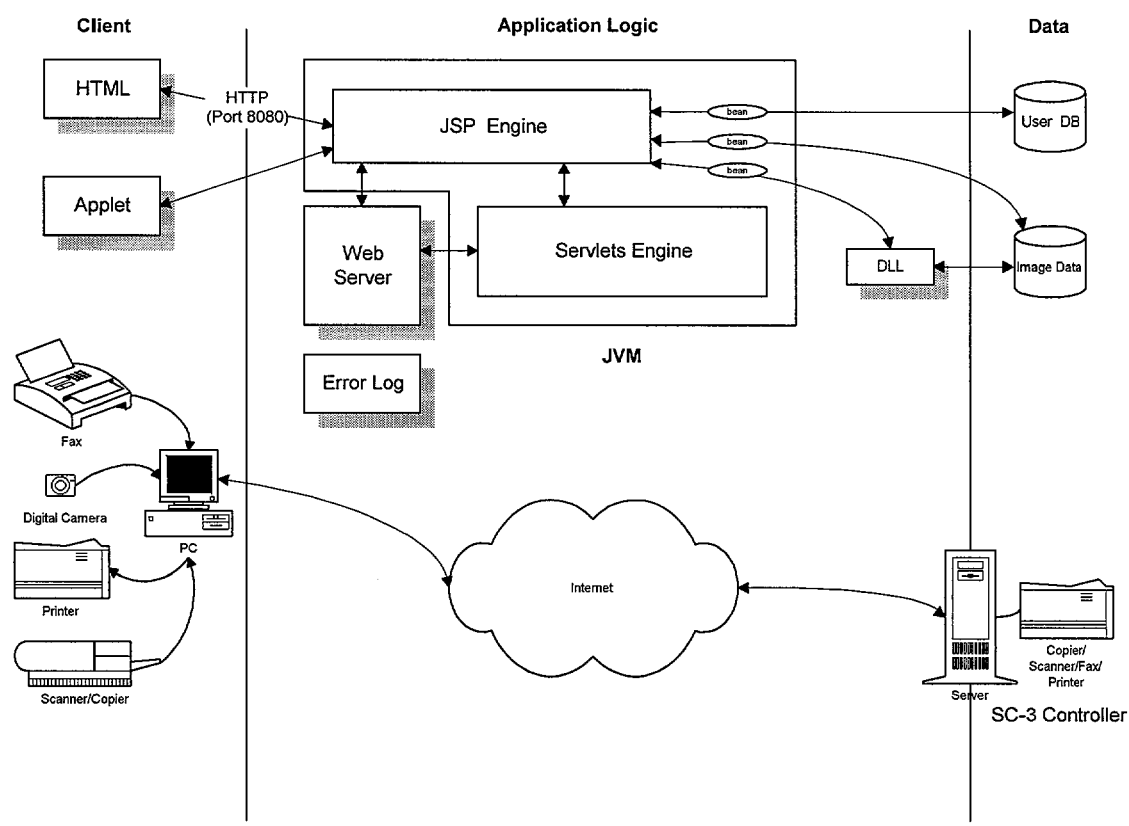
FIG. 3 shows the client/web server application diagram as contemplated by the present invention.
Figure 5:
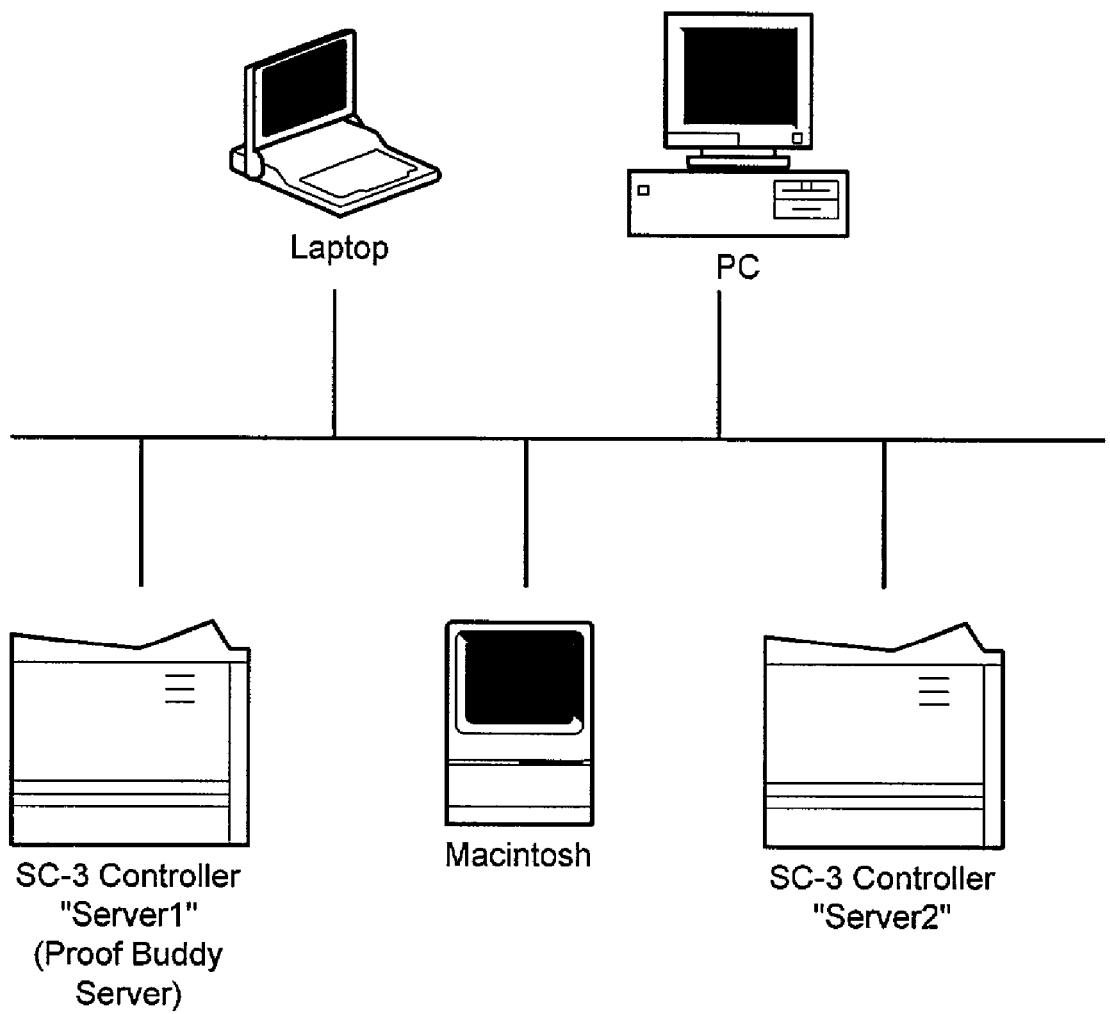
FIG. 5 is a block diagram of an alternative embodiment of the present invention utilizing multiple servers to share the load.
Figure 6:
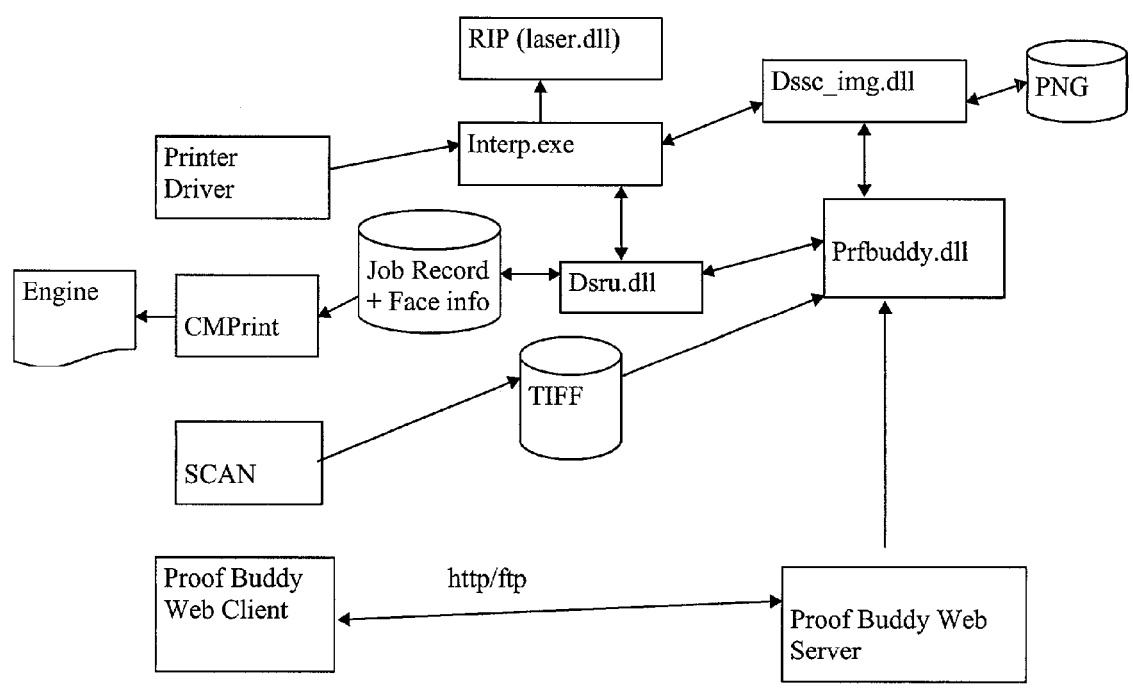
FIG. 6 is a block diagram of the various functions and modules of the preferred embodiment of the present invention.
Figure 7:
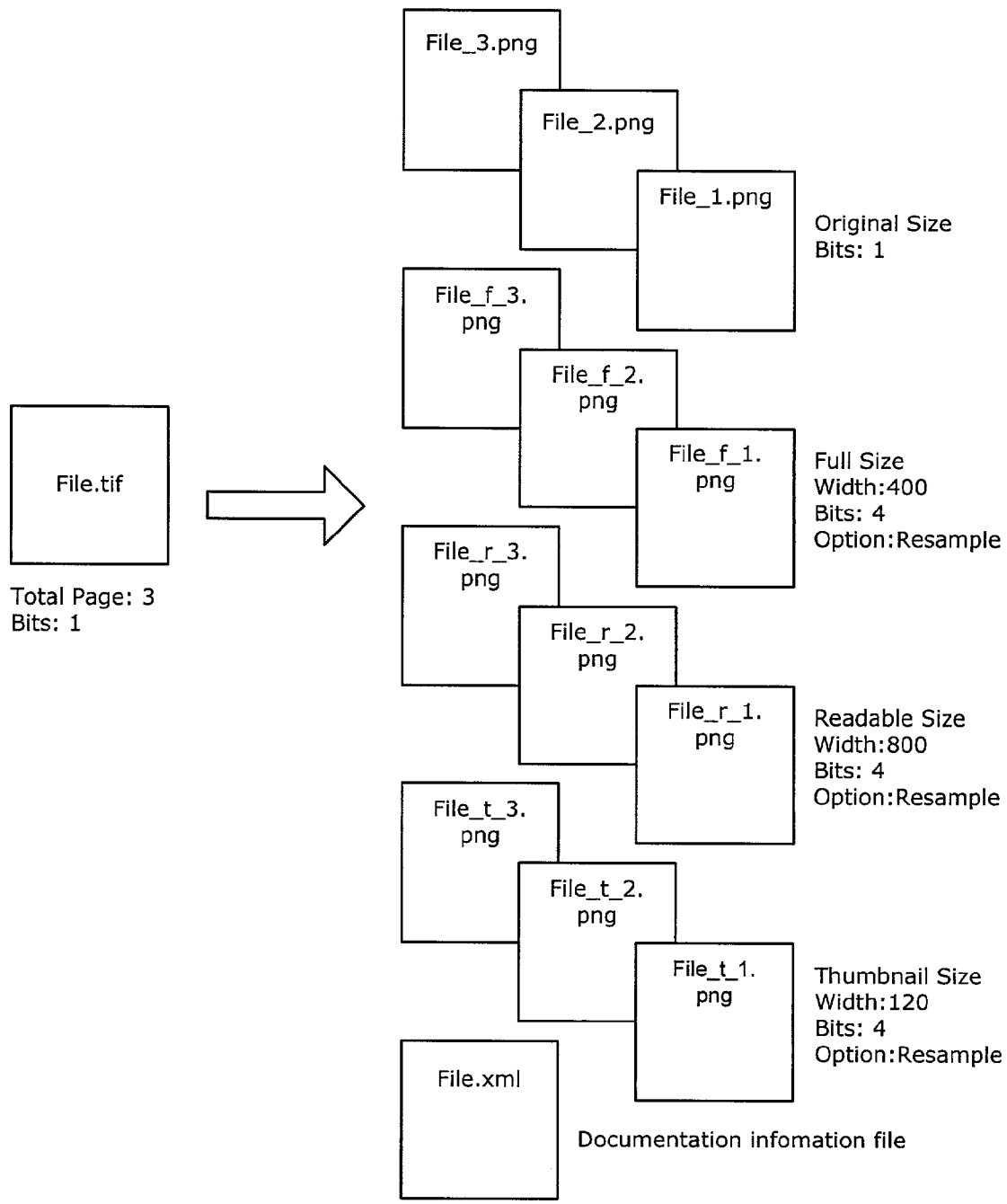
FIG. 7 shows an example of the relationship of file formats stored by the present invention.

FIG. 2 is a block diagram showing the functions of the server and the various steps for utilizing these functions. FIG. 3 is another block diagram detailing various interconnections between hardware and software modules as contemplated by the present invention. FIG. 5 shows an alternative embodiment of the present invention. In this embodiment there are multiple servers. The various functions may be distributed between the servers to improve performance. The server and various computers are all shown connected to the same network. FIG. 6 is a block diagram that shows the various functional components and the software modules utilized for performing those functions. Similarly, FIG. 8 shows various the interconnection between user modules as contemplated by the present invention.

The invention includes a database of user profiles maintained in order to implement security levels. Supported security levels include Administrator, Registered User and Non-registered User. An example indicating the various fields that may comprise the database are illustrated in FIG. 4. A username and password login are required to maintain security between users. The same username and password may also be used for Web Administration, Driver and Front Panel access. Documents and files shall be stored in the proofing system repository. The internal graphic file format of the proofing system is preferably PNG, but of course any graphic file format could be used without departing from the invention.

The initial settings preferably include two default folders. These folders are considered proofing system folders and cannot be deleted. These initial folders included as part of the proofing system are preferably named PUBLIC and DEPARTMENT. The PUBLIC folder is a shared folder that can be read or written to by any user. This folder is a common repository that any user can access. The DEPARTMENT folder is also a shared folder that can be read by any user, but can only be written to by the Administrator. This folder is intended to hold common departmental forms and documents that any user can read or print, but can only be modified by the Administrator The name of the DEPARTMENT folder can be changed by the Administrator.

Figure 10:
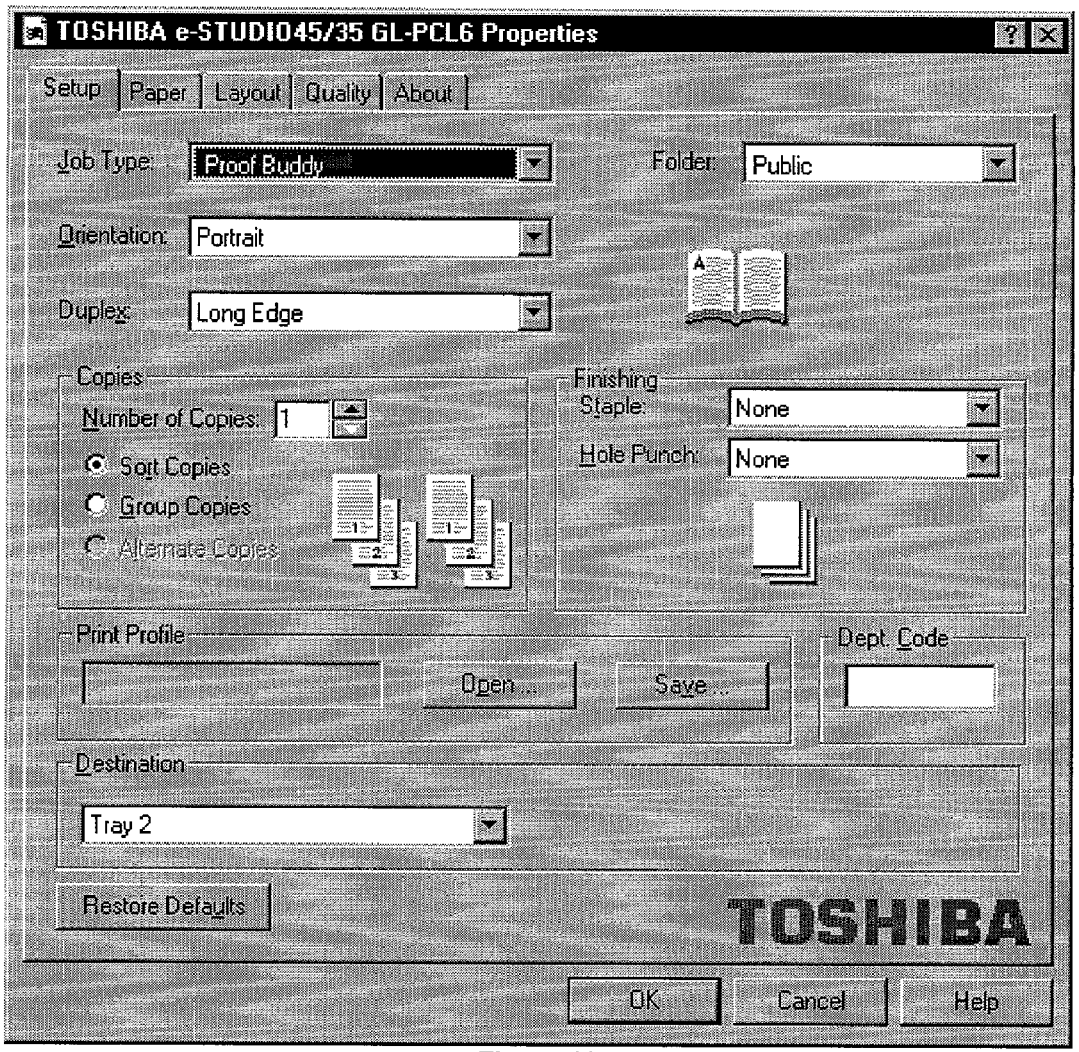
FIG. 10 is a sample screen for sending a print job to the system of the present invention.
Figure 11:
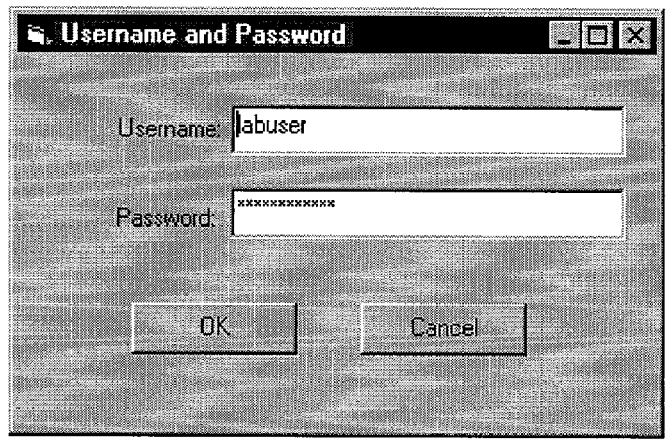
FIG. 11 is a sample login screen view for use with the present invention.

There are two methods for sending files to the present proofing system: 1) as a print job, where a file is printed to the proofing system, and 2) as a scan job, where hardcopy is scanned to the proofing system. A user can send print jobs to the proofing system from a Windows application with a proper server printer driver (e.g. for a GL-1010 server) by selecting a job type, indicated in the figure as "Proof Buddy." FIG. 10 shows the "Setup" tab of the current GL-1010 printer driver and the new Proof Buddy job type. By default all proofing system jobs are stored in the Public folder. Administrator and Registered users may select a private folder in the proofing system repository. Administrator and Registered users must enter a valid login ID/username and password/PIN to select a Private folder. An Administrator user can also send print jobs to the DEPARTMENT folder of the proofing system repository. Referring to FIG. 11, when the user selects the folder DEPARTMENT or Private, the following dialog pops up to prompt the user for the username/LoginID and password. After the user clicks OK, the username and password will be verified with the proofing system. If the username and/or password are not valid, the user will be prompted to re-enter the information.

A user can scan hardcopy documents into the proofing system repository by selecting a "Scan" and "Send destination." From the front panel, the user shall be presented with an optional proofing system as a scan destination. For a non-registered user, the default Public folder of the proofing system is shown. For registered users, the default Public folder and private folder are shown. For Administrator users, the DEPARTMENT folder is shown in addition to the default Public and private folders. The user selects a folder and proceeds to scan. The user can change any scan job parameters as needed. A document that contains scan pages is automatically created by the proofing system. The name of the document generated by the proofing system is displayed on the front panel. Upon completion of the scan job, the user can use a web browser to access the proofing system to manage or edit the scanned files. An Administrator user can also select the DEPARTMENT folder to scan hardcopy to the proofing system repository.

The present proofing system has the ability to edit and manage document folders, documents, document page images and access to Public folder. Private folders are restricted to Registered Users and Administrator user. In addition to managing folders, documents and files, the Administrator has the responsibility to configure the proofing system, manage user profiles, and manage the proofing system repository. Users access the proofing system by entering the proofing system URL address in a web browser or by clicking on a "Proof Buddy" button installed on the Top Access web screen.

Users must login to the proofing system to view Private folders. There are three types of users, Administrator, Registered User, and Non-Registered User. Registered Users and Administrators are required to enter a valid user ID and password/PIN (Personal ID Number). If the user enters an invalid User ID, PIN or leaves the fields blank, the user will be prompted to create a "Proof Buddy" Account. The user would then create an account by entering a username, password, account description and a valid e-mail address. When the required information is completed, the user can click on the "OK" button to create a new account. If the information is valid, a "Proof Buddy" account is created and the user enters the proofing system. If the user clicks on the "Cancel" button, the user will enter the proofing system as a Non-Registered User. FIG. 12 is an example of the Login Screen and FIG. 13 is an example of a "Create Your Proof Buddy Account" screen.

After a user has successfully logged into the proofing system, a system Documents Explorer view web page (as shown in FIG. 15) will be displayed, with a menu, toolbar and buttons of the available functions (FIG. 14). Some buttons may be disabled or hidden, depending on the user's login type.

Figures 16, 17A, 17B, 17C:
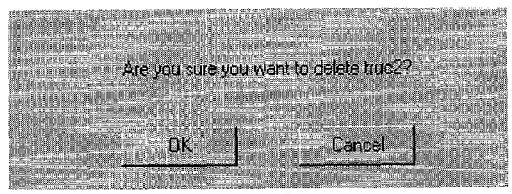
FIG. 16 is a table detailing the various rights granted based on user login.
FIG. 17a is an example of the User Management Screen of the prevent invention.
FIG. 17b is an example of a New User Profile Screen of the present invention.
FIG. 17c is an example of the Remove User Confirmation screen of the present invention.

A Non-Registered user shall be allowed access only to the Public and DEPARTMENT folders. Non-Registered users can create sub-folders, print and manage all image files in the Public folder. Non-Registered Users shall be restricted to only reading/printing image files from the DEPARTMENT folder, but cannot create sub-folder, add, delete or change files in the DEPARTMENT folder. FIG. 16 is a table detailing the various rights.

A "Registered" user shall be allowed access to an assigned Private folder as well as the Public and DEPARTMENT folders. This Private folder is created when the user registers or when the Administrator creates the user account. Registered users can manage and print image files in Public and assigned private folders. Registered Users can print image files from the DEPARTMENT folder, but cannot add, delete or change files in the DEPARTMENT folder. Registered users can edit and change their own user profile information, e.g. login PIN (Personal Identification Number).

The Administrator can access and manage all folders and files within the proofing system. The Administrator is responsible for managing storage by moving, deleting files and change storage path if required. The Administrator can also add users, delete users and edit Registered user profiles. When a user logs in as the Administrator, extra tabs and buttons are enabled on the web browser to allow the Administrator to manage users and storage.

The user can logout of the proofing system by clicking on the Logout button. A registered user or Administrator user is automatically logged out after a period of inactivity. The length of this period, between 5 and 120 minutes, can be set in the User Preferences. A warning message is sent to the user 1 minute before the user is automatically logged out.

The Administrator shall perform user management by clicking on the User Management toolbar button. After the User Management button has been clicked, a web screen similar to FIG. 16a shall be displayed to let the Administrator manage the user profiles.

The Administrator uses the "New User" button to crate a new user profile. After clicking on the "new User" button, a user profile web page (FIG. 17b) is displayed to let the Administrator create a new user profile. The administrator enters User ID and PIN. After the Administrator clicks on the "Add" button, a new user profile is created in the user database of the proofing system. A private folder with the same name as the user name is automatically created for the user. After the new user is added, the proofing system will automatically update the User Profile Display (FIG. 15).

The Administrator deletes a user from the user profile database by highlighting the user name then clicking on the "Delete" button from the User Management web page (FIG. 17a). A confirmation dialog box (FIG. 17c) shall be displayed to ensure the Administrator wants to remove the user. Once the Administrator confirms the removal, the user account and username will be deleted from the proofing system database. The proofing system will also remove the assigned private root folder and all the private sub-folders of the deleted user. After the user is deleted, the proofing system will automatically update the User Profile Display (FIG. 17a).

The Administrator shall modify users information by clicking on the "Edit" button of the User Management web page (FIG. 17a). A web page similar to FIG. 17b will be used by the Administrator to change user's information. Registered users can modify their own profiles by clicking on a button or a tab on proofing system Exploring web page. A registered user shall not be allowed to change his user ID. After the user has updated his profile, the proofing system will automatically update the User Profile Display (FIG. 15).

Figure 17D:
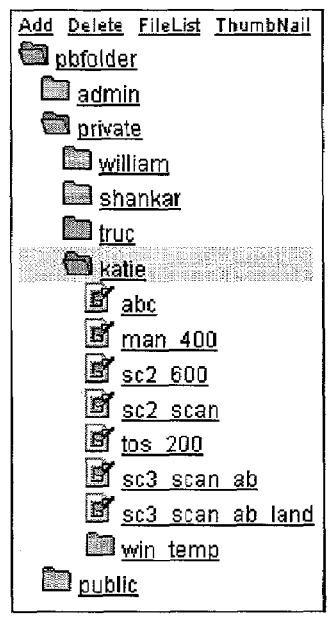
FIG. 17d is an example of the Folder Display used by the system of the present invention.

The present proofing system stores the documents in folders. Each document consists of one or more page image files. Each folder may also contain sub-folders, which may also contain sub-folders or other documents. Only the Administrator can delete the private root folders of proofing system. All users can create and delete sub-folders in the Public folder. Registered users can also create and delete the private sub-folders in their private folders. When the proofing system Folder Tree is displayed, only the folder/files that the user has Read access to will be visible. An example of the Folder Tree display is shown in FIG. 17d.

As indicated above, there are two types of folders: public and private. All users shall have access to public folders.

Only the owners and the Administrator shall have access to private folders. The initial factory settings of the present proofing system include two default public folders, PUBLIC and DEPARTMENT folders. These folders shall be considered system folders and cannot be deleted. Only the Administrator can send files to the DEPARTMENT folder. Each time a new user is added; a private root folder is created for this new user. The name of this private folder is the same as the user name, and cannot be changed by the user. When the Administrator removes a user from the user database, the private root folder and all its sub-folders that were assigned to this user shall be removed as well. Access to the various folders is controlled based on user type. FIG. 17g shows an example of user rights based on user type as contemplated by the present invention.

Figure 17E:
FIG. 17e is an example of the Folder Toolbars used by the system contemplated by the present invention.

The proofing system navigation and editing tools are provided through a toolbar (FIG. 17e) or web tabs and a drop down menu The Administrator and Registered User shall have the ability to create a New Folder, Delete an existing Folder, Rename a Folder and display the Properties of a Folder.

Figure 17F:
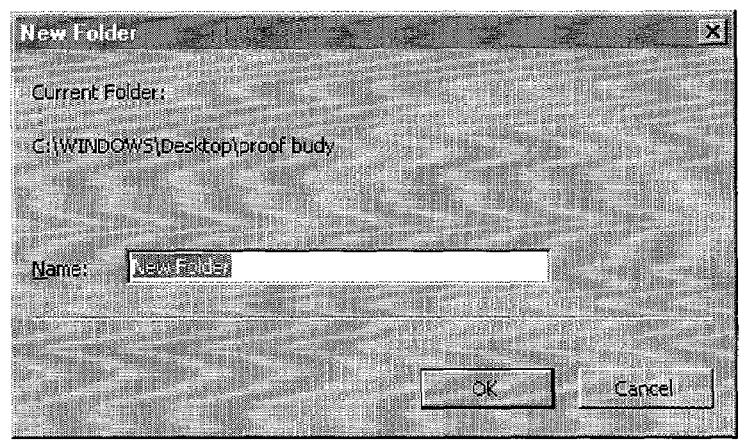
FIG. 17f is an example of a New Folder Confirmation screen contemplated by the present invention.

The user creates a new folder by using the folder structure display (FIG. 17d) and highlighting a folder. The New Folder menu is then selected to create a new sub-folder under the current selected folder. The proofing system prompts the user (FIG. 17f) for the name of the new folder. After the new folder is created, the proofing system will automatically update the folder structure display to reflect the additional folder.

A user who has write access to a folder can delete the folder. The user first highlights the folder he wants to delete in the folder structure display. Then, the user clicks on the "Delete Folder" selection, using the toolbar (FIG. 17e) or web tabs and a drop down menu. The proofing system prompts the user for confirmation. After the folder is deleted, the proofing system automatically updates the folder structure display to reflect the current folder structure.

The user who has write access to a folder can rename the folder. The user first highlights the folder using the folder structure display (FIG. 17d). Using the toolbar (FIG. 17e) or web tabs and a drop down menu, click the "Rename" selection. The proofing system prompts the user for a new folder name, for example. After the folder is renamed, the proofing system automatically updates the folder structure display to reflect the current folder structure.

A user who has write access to a folder can display the properties of the folder. The user first highlights the folder in the folder structure display (FIG. 17d). Then, using the toolbar (FIG. 17e) or web tabs and a drop down menu, click the "Properties" selection. The proofing system displays the properties of the folder (FIG. 17h).

The proofing system displays document image files in four different views: Thumbnail view, File List view, Full Page view and Readable View. Each image file view is displayed in the proofing system Explorer View. Toolbar buttons or menu options will be used to switch to different views. The directory tree is used to select the folder and the document to display image files. When a folder is selected, the documents contained in the folder are displayed. When a document is selected, the page image files of the document are displayed on the right side of the proofing system Explorer.

"Thumbnail View" is the default file view of Proof Buddy System. In this view the proofing system displays each image file in a small thumbnail size with a file name or page number identification and a check box. Users may use the check box to mark the selection. A single or multiple selections can be checked for file operations, e.g. move, copy, delete, print, etc. Users may click on a thumbnail image or a file name to view the full-page image of the file or check the box and click the "Full Page" selection on the toolbar.

In "File List" view, only the file names and check boxes are displayed. Users may use this view to manage a folder with a large number of files or to speed up the screen display. Users may use the check boxes to select a single file or multiple files to perform file operations upon, e.g. move, copy, delete, print, etc. To show a document in File List View, the user just clicks the "File List" button on the toolbar. To return to Thumbnail View, the user clicks the "Thumbnail View" button on the toolbar. To display a Full Page View, the user checks the box next to the file name then clicks the "Full Page" button on the toolbar.

In "Full Page" view, the proofing system displays the full-page size of the image, with additional tool bar buttons or menu options that allow the user to page forward, page backwards, scroll Right/Left/Up/Down, go to the beginning of the document, and go to the end of the document. Editing functions are also enabled to allow the user to modify the document image. In this view, users also can enable the ruler option to display a ruler image.

To page forward, the user clicks on the "Next Page" button and the proofing system displays the next page of the document. If "Next Page" is clicked at the end of the document, an error message is returned.

To page backwards the user clicks on the "Previous Page" button and the proofing system displays the previous page of the document. If "Previous Page" is clicked at the beginning of a document, and error message is returned.

To go to the beginning of the document the user clicks on the "Beginning of Document" button. The proofing system displays the first page of the Document. To go to the last page of the document the user clicks on the "End of Document" button and the proofing system displays the last page of the Document. Scrolling Up/Down/Right/Left is accomplished by the slide bars on the bottom and right side of the full-page view editing window.

In "Readable" view, the proofing system displays a readable size of the image, with additional tool bar buttons or menu options that allow users to page forward, page backwards, scroll Right/Left/Up/Down, go to the beginning of the document and go to the end of the document. Editing functions are enabled to allow the user to modify the document image. User can also enable a ruler option that displays horizontal and vertical markers for length approximation.

Users can use the Proof Buddy image management functions (FIG. 18) to build a document, to change the page order of an existing document, or to combine pages of multiple documents. These functions are selected from a toolbar or edit menu options.

The user can move one or more pages of a document to another document. The user can also move one or more documents to another folder. The user can also move one or more folders to another folder. Document pages and documents/folders can only be moved to a document or folder that the user owns or has "write" access to.

To move one or more pages of a document:
1. Go to the "Proof Buddy" System Explorer
2. Select one or more pages to be moved by marking the check boxes
3. Click on the "Move" button
4. Select the destination document or folder 5. Click on the "OK" button to start the operation or "Cancel" to cancel the operation.

The selected pages will be moved to the destination. If the destination is a document, the pages will be appended at the end of the destination document. If the destination is a folder, the user is prompted to create a new document in this folder. After the pages are moved, the Proof Buddy Explorer view is automatically updated to reflect the movement of the pages. If all the pages of the source document are moved, the source document will be deleted.

To move one or more documents/folders:
1. Go to the "Proof Buddy" System Explorer
2. Select one or more documents/folders to be moved by marking the check boxes.
3. Click on the "Move" button
4. Select the destination document or folder
5. Click on the "OK" button to start the operation or "Cancel" to cancel the operation.

The selected documents/folders will be moved to the destination. If the destination is a document, the source documents will be appended at the end of the destination document. If a document with the same name already exists in the destination folder, the user will be prompted to replace the existing file or skip the operation. After the documents/folders are moved, the Proof Buddy Explorer view is automatically updated to reflect the new structure.

The user can copy one or more pages of a document to another document. The user can also copy one or more documents to another folder. The user can also copy one or more folders to another folder. Document pages and documents/folders can only be copied to a document or folder that the user owns or has "write" access to.

To copy one or more pages of a document:
1. Go to the "Proof Buddy" System Explorer
2. Select one or more pages to copy by marking the check boxes
3. Click on the "Copy" button
4. Select the destination document or folder
5. Click on the "OK" button to start the operation or "Cancel" to cancel the operation.

The selected pages will be copied to the destination. If the destination is a document, the pages will be appended at the end of the destination document. If the destination is a folder, the user is prompted to create a new document in this folder. After the pages are copied, the Proof Buddy Explorer view is automatically updated to reflect the new structure.

To copy one or more documents/folders:
1. Go to the "Proof Buddy" System Explorer
2. Select one or more documents/folders to copy by marking the check boxes
3. Click on the "Copy" button
4. Select the destination document or folder
5. Click on the "OK" button to start the operation or "Cancel" to cancel the operation.

The selected documents/folders will be copied to the destination. If the destination is a document, the pages will be appended at the end of the destination document. If a document with the same name already exists in the destination folder, the user will be prompted to replace the existing file or skip the operation. After the documents/folders are copied, the Proof Buddy Explorer view is automatically updated to reflect the new structure.

The user can delete one or more pages, documents and folders. The user can only delete the items that the user owns or has "write" access to.

To delete one or more pages, documents or folders:
1. Go to the "Proof Buddy" System Explorer
2. Select one or more items to delete by marking the check boxes
3. Click on the "Delete" button
4. The user will be prompted to confirm the delete for each item or all items. After the operation, the Proof Buddy Explorer view is automatically updated to reflect the new structure.

The user can rename one or more documents and folders. The user can only rename the items that the user owns or has "write" access to.

To rename one or more documents or folders:
1. Go to the "Proof Buddy" System Explorer
2. Select one or more items to rename by marking the check boxes
3. Click on the "Rename" button
4. The user will be prompted for confirmation of the rename of each item. After the operation, the Proof Buddy Explorer view is automatically updated to reflect the new structure.

The user can display the properties of a selected item by first checks the check box next to the page, document or folder, then click on the "Properties" button.

The user can re-arrange one or more pages of a document. The user can only re-arranges the documents that the user owns or has "write" access to.

To re-arrange one or more pages of a document:
1. Go to the "Proof Buddy" System Explorer
2. Select one or more pages to move by marking the check boxes
3. Click on the "Move Up" button to move the pages up 1 position or click on the "Move Down" button to move the pages down 1 position. If the selected pages are already at the top of the document, "Move Up" has no effect. If the selected pages are already at the end of the document, "Move Down" has no effect.

The user can insert a blank page into a document. The user can only insert into a document that the user owns or has "write" access to. The default page size is the size of the selected insertion point page. The user can also select a different page size for the blank page.

To insert a blank page into a document:
1. Go to the "Proof Buddy" System Explorer
2. Select a page that a blank is to be inserted in front of, by marking the check boxes
3. Click on the "Insert Blank" button. A blank page is inserted in front of the selected page. After the operation, the Proof Buddy Explorer view is automatically updated to reflect the new structure.

For editing, FIG. 19 is a display of a toolbar that lists the types of edits available by the present invention.

"Edge Erase" creates a white border outside the selected area. Select one or more pages of a document to apply Edge Erase by checking the check boxes next to the items. Clicking on the Edge Erase button causes a dialog box to be displayed. A dialog box prompts the user for a new margin in inches or mm. To apply Edge Erase, the user clicks on the "OK" button. All the selected items will have their edges erased.

"Mirror Image" is a function that creates a mirror image of the selected page/pages. Select one or more pages to Mirror Image by checking the check boxes next to the items. Clicking a "Mirror Image" button will mirror images the files. All the selected items would be mirror imaged.

"Negative/Positive" is a function that reverses the black and white areas of one or more pages of a document. Select the pages to Negative/Positive by checking the check boxes next to the items. Clicking on the "Neg/Pos" button reverses the black and white areas of the pages. All the selected items would have the black and white reversed.

"Page Numbering" is a function that allows for the printing of page numbers on the document. Select one or more pages to add page number to by checking the check boxes next to the items. Clicking on the "Page Number" button causes a dialog box to be displayed. The dialog box requests the initial page number, the position of the page number on the page, Format Type, Font Type and Font Size. To page number the selected items, the user clicks on "OK". All the selected items would have their pages numbered in sequential order.

"Rotate" is a function that rotates the entire image 90 degrees. Select one or more pages to rotate by checking the check boxes next to the items. Clicking on the "Rotate" button rotates the selected pages 90 degrees.

"Flip" is a function that flips the entire image upside down. Select one or more pages to flip by checking the check boxes next to the items. Clicking on the "Flip" button flips all the selected pages.

"Shear" is a function that slants the entire image a specified angle. Positive value specifies clockwise angle, negative counterclockwise. Select one or more pages to shear by checking the check boxes next to the items. Clicking on the "Shear" button causes a dialog box to be displayed to prompt for the angle. To apply shear, the user clicks on the "OK" button.

"Image Filters" provide some tools for removing "noise" from a document. Noise is usually results from a poor scanning or faxing operation. The following image filters could be included with the present proofing system: De-Speckle, De-Skew, Border Removal, Hole Removal, Smoothing, Margin Cropping, Noise Removal, Line Removal. Select one or more pages to apply the filter to by marking the check boxes next to the items. Clicking on the appropriate filter button. All the files checked would have the filter applied. One level of "undo" will be provided. Image Filters functions are processor-intensive and may affect the server's performance. A status bar may be provided to show the progress of applying the filter. The status bar is automatically updated.

The "De-Speckle" filter detects and removes random dots (Speckle) from a page. The "De-Skew" filter detects the skew of the page by analyzing the text or image elements and modifies the image to remove the skew. Parameters include minimum angle to detect, max angle to correct, and what percentage of the image to use in detection processing. De-skewed images typically compress better, resulting in smaller file size. The "Border Removal" filter crops black edges around the page that are usually produced by a scanning operation.

The "hole removal" filter is specifically designed to find and remove the marks left on an image when scanning a document which had binder holes punched in it (for example, three hole punching in the left margin). The "Smoothing" filter removes bumps and spurs on characters and fills in small holes. This process improves the appearance of the image, and helps reduce compressed file size without losing image detail. The "Margin Cropping" filter crops the image edges down to a definable margin around the text or image on the page. The "Noise Removal" removes "Noise" from the image, small black marks on the image that can come from fax transmission errors, dirty scanners or copiers, etc. This filter removes the noise from images to enhance recognition and reduce file size. The "line removal" filter finds and removes horizontal and vertical lines and repair overlapping text and graphics. These decrease the file size, and will often help OCR produce better results. The line removal filter can also be configured to reconstruct horizontal and vertical lines, "redrawing" them straight with smooth edges. The "Undo" button will remove the last filter applied.

FIG. 20 shows a toolbar listing the file functions available with the present invention. The "Save" selection saves all changes into the page image file, the original page will be overwritten. "Save As" saves the current page image as a new document and the original page is unmodified. A dialog box will be displayed and a prompt for a new document name. If the new name already exists, then a prompt to confirm the overwrite operation will be displayed, otherwise a new document is created.

The user can print an entire document from the proofing system or one or more pages of a document. The user can print any item to which the user has "read" access. The default printer settings for this document are saved with the document at the time the document is sent to the proofing system. The user can change the printer settings to print the document. The user can also save new printer settings with the document if the user has "write" access to the document.

To print a document:
1. Go to the "Proof Buddy" System Explorer.
2. Select a document to print by marking the check box.
3. Click on the "Print" button.
4. The user will be shown a printer properties form with a set of features similar to those of the GL-1010 printer driver. The user can then configure the printing as if it is a normal print job. Once the printer settings have been selected, clicking OK will send the Proof Buddy document to the printer.

To print one or more pages of a document:
1. Go to the "Proof Buddy" System Explorer.
2. Select a document to view the thumbnail pages.
3. Select one or more pages to print by marking the check boxes.
4. Click on the "Print" button
5. The user will be shown a printer properties form with a set of features similar to those of the GL-1010 printer driver. The user can then configure the printing as if it is a normal print job. Once the printer settings have been selected, clicking OK will send the selected pages of the document to the printer.

To print the currently viewed page:
1. Click on the "Print" button.
2. The user will be shown a printer properties form with a set of features similar to those of the GL-1010 printer driver. The user can then configure the printing as if it is a normal print job. Once the printer settings have been selected, clicking OK will send the currently viewed page to the printer.

A "Fax send" feature is only supported if fax option is installed on the GL-1010 printer controller. The user can fax an entire document or one or more pages of a document. The user can fax any item that the user has "read" access to.

To fax a document:
1. Go to the "Proof Buddy" System Explorer.
2. Select a document to send by marking the check box.
3. Click on the "Fax" button.
4. The user will be shown a fax properties form with a set of features similar to those of the GL-1010 fax driver. The user can then configure the fax as if it is a normal fax job. Once the settings have been selected, clicking OK will send the Proof Buddy document to the fax recipients.

To fax one or more pages of a document:
1. Go to the "Proof Buddy" System Explorer.
2. Select a document to view the thumbnail pages.
3. Select one or more pages to send by marking the check boxes.
4. Click on the "Fax" button.
5. The user will be shown a fax properties form with a set of features similar to those of the GL-1010 fax driver. The user can then configure the fax as if it is a normal fax job. Once the settings have been selected, clicking OK will send the selected pages of the document to the fax recipients.

To fax the currently viewed page:
Click on the "Fax" button. The user will be shown a fax properties form with a set of features similar to those of the GL-1010 fax driver. The user can then configure the fax as if it is a normal fax job. Once the settings have been selected, clicking OK will send the currently viewed page to the fax recipients.

The Administrator can backup or restore the entire proofing system, including user profiles database to a local storage device.

To backup the proofing system:
1. Login to the "Proof Buddy" system as "Administrator."
2. Select Backup from the Main Menu.
3. Select one or more of the items to backup: PUBLIC folder, DEPARTMENT folder, PRIVATE folder, user database.
4. The user is then prompted for a destination. The process may be lengthy because of the size of the proofing system.

To restore the proofing system:
1. Login to the "Proof Buddy" as "Administrator."
2. Select Restore from the Main Menu.
3. The user is then prompted for a Proof Buddy backup file. The selected file will then be restored to the controller, overwriting the existing proofing system. The process may be lengthy because of the size of the proofing system.

The "User Preferences" screen allows the user to customize the settings for the proofing system. This page has a Save and Reset buttons. The Save button allows the user to save the current settings of this page. If the user has not clicked on the Save button, the Reset button allows the user to revert the page data to the original data before he has made the changes. FIG. 21 is a table listing the customizable user preferences. The "Admin Settings" screen allows the proofing system administrator to set certain parameters that affect the configuration and setup of the proofing system. An example of the screen is shown in FIG. 22.

A description of the SC-3 Proof Buddy design specification for the controller and client side now begins. The client printer driver will send the PCL or PS as a "Proof Buddy" job to Interp/RIP for processing. The web client will Communicate with the controller via http. The following inputs are received from the printer driver:

Specify "Proof Buddy" Job with the PJL Comment
DSSC PRINT PRINTMODE=PROOFBUDDY
DSSC PRINT PROOFBUDDYFOLDER=PRIVATE
DSSC PRINT PROOFBUDDYDOCUMENTNAME=xyz
DSSC PRINT PROOFBUDDYUSERNAME=jon
DSSC PRINT PROOFBUDDYPASSWORD=xxx (encrypted)

The "Proofbuddyfolder" may be PRIVATE, PUBLIC, or ADMIN. The "Proofbuddypassword" might not be required because the printer driver should verify the user name and password before sending the print job to proof buddy on the controller. However, if this functionality cannot be achieved on the printer driver. The client side will provide an API to the user and password authentication.

Once received the printing information, Interp.exe/RIP detects the "Proofbuddy" save job. It will call dssc_img.dll to convert the rector format to PNG files. Files will be stored in the following format:
On Public Folder
  Filename_username_MMDDYY_HHMMSS
For Private Folder
  Filename_MMDDYY_HHMMSS
  For example, a 4-page document name "worddoc" on the "Public Folder" will be stored as follows:
  Original Size
Worddoc_Jon_012201_220005_1.png
Worddoc_Jon_012201_220005_2.png
Worddoc_Jon_012201_220005_3.png
Worddoc_Jon_012201_220005_4.png
And Width 1200 for Full Size View
Worddoc_Jon_012201_220005_f_1.png
Worddoc_Jon_012201_220005_f_2.png
Worddoc_Jon_012201_220005_f_3.png
Worddoc_Jon_012201_220005_f_4.png Width 600 for Readable View
Worddoc_Jon_012201_220005_r_1.png
Worddoc_Jon_012201_220005_r_2.png
Worddoc_Jon_012201_220005_r_3.png
Worddoc_Jon_012201_220005_r_4.png Width 160 for Thumbnail View
Worddoc_Jon_012201_220005_t_1.png
Worddoc_Jon_012201_220005_t_2.png
Worddoc_Jon_012201_220005_t_3.png
Worddoc_Jon_012201_220005_t_4.png The Full size, Readable, and Thumbnail maybe converted locally on the client side from the original size PNG found on the server to reduce the server load.

Job and Face record information will be saved on the document information file (.inf) by calling the API provided from the client side. The path for the proof buddy user and user authentication (if implementing on the controller side) will also be accomplished by calling the API provided by the client side.

A scanned job must be in a multi-page TIFF file format. Scanner must either call our API in prfbuddy.dll or scanner do the conversion by itself.
DWORD WINAPI ProofBuddyTiffToPNGs(LPTSTR szTiffName,
LPTSTR szTiffPath, LPTSTR szPNGName, LPTSTR szPngPath)
This API will call DssclmageTiffSplitToPNGs in dssc_img.dll to convert the Tiff file to PNG files.

For example, a 4-page Worddoc_Jon_012201_220005.tif will be converted to

Original Size
Worddoc_Jon_012201_220005_1.png
Worddoc_Jon_012201_220005_2.png
Worddoc_Jon_012201_220005_3.png Worddoc_Jon_012201_220005_4.png
And Width 1200 for Full Size View
Worddoc_Jon_012201_220005_f_1.png
Worddoc_Jon_012201_220005_f_2.png
Worddoc_Jon_012201_220005_f_3.png
Worddoc_Jon_012201_220005_f_4.png Width 600 for Readable View
Worddoc_Jon_012201_220005_r_1.png
Worddoc_Jon_012201_220005_r_2.png
Worddoc_Jon_012201_220005_r_3.png
Worddoc_Jon_012201_220005_r_4.png Width 160 for Thumbnail View
Worddoc_Jon_012201_220005_t_1.png
Worddoc_Jon_012201_220005_t_2.png
Worddoc_Jon_012201_220005_t_3.png
Worddoc_Jon_012201_220005_t_4.png For outputting from "Proofbuddy" files (PNG) to printer. To print, client calls prfbuddy.dll API.

INT WINAPI ProofBuddyPrint(LPTSTR szPNGName, LPTSTR szPNGPath, LPTSTR szUserName, UINT folderType, print_parm *print_parm, LPTSTR szPageRange)

Upon calling the ProofBuddyPrintwParm API. The prfbuddy.dll will use dsru.dll to create the job record and face record. Face will be created from the saved PNG file (convert PNG to rector) combined with print parameters passed to this API. The controller will also update the document information file (.inf) by calling the API provided by the client side. The print job will be added to the queue on the registry by calling the DSRU API. CMPrint obtains print job from the queue and printout.

---

```
API's
3.1 dssc_img.dll
        Internal used on the controller side.
        Modify dssc_img.dll to output the png files corresponding to the number of pages of
the proof buddy document.
        DWORD WINAPI DsscImageTiffSplitToPNGs( LPTSTR szTiffName, LPTSTR
            szTiffPath, LPTSTR szPngName, LPTSTR szPngPath)
        DWORD WINAPI DsscImageConvert(LPSTR, FromFilename, LPSTR
            szToFilename, ORD wToFormat)
Print
        INT WINAPI ProofBuddyPrint(LPTSTR szPNGPath, LPTSTR szPNGName, LPTSTR
            szUserName, UINT folderType, print_parm *print_parm, LPTSTR szPageRange)
szPNGName: document name (PNG file) without the png extension.
szPNGPath: Full path to the png file including '\'.
For example, h:\proofbuddy\abc\.
szUserName: user name
folderType:    PRIVATE = 1
               PUBLIC = 2
               ADMIN = 3
print_parm:
typedef struct print_parm {
    UINT resolutionWidth;
    UINT resolutionHeight;
    UINT imageSizeWidth;
    UINT imageSizeHeight;
            UINT copies;//# of copies
    UINT bindingEdge;//0—short edge, 1—long edge
    UINT papersize;
    UINT feedRotation;    /*0 = short edge, 1=long edge */
    UINT duplex;//0 single side, 1=book, 2-tablet
    UINT duplexId//
    UINT stapling;      //1 staple, 2.. (other positions), corresponding to PJL comment
value
    UINT holepunch;      //ranges from 0-4, corresponding to PJL comment value
    UINT finishing;    //0 - sort, 1 - group (Collated, uncollated)
        UINT alternation; //0 - off, 1- on
    UINT inputBin;
/*AUTO_TRAY = 0,
                BYPASS=1,
                UPPER=2,
                LOWER=3,
                PFP1=4,
        PFP2=5*/
    UINT exitBin; Tray 1 to 20
            CHAR sPin[5];    /* Pin for Private print job */
            CHAR schedule_time[32];        /*"YYYYMMDD hhmm" or "Tdddddd..."
        (dddddd... is the decimal value of time_t) schedule print due time */
            CHAR departmentCode[5];
} print_parm;
PaperSizes {
    LETTER        = 0,
    LEGAL         = 1,
    A4            = 2,
    EXECUTIVE     = 3,
    STATEMENT     = 4,
    A3            = 5,
    B4            = 6,
```

-continued

```
        B5          = 7,
        LEDGER      = 8,
        COMPUTER    = 9,
        FOLIO       = 10,
        UNIVERSAL   = 11,
        A5          = 12,
        A6          = 13,
        AUTO        = 14,
        LETTER_R    = 15,
                A4_R    = 16,
        A5_R        = 17,
        B5_R        = 18,
        LEGAL13     = 19,
        8_5SQ       = 20,
    };
            LPTSTR szPageRange
                "CURRENT PAGE": Print current PNG file (page)
                "ALL PAGES": Print All pages in the document
                "1-10": Print Page 1-10.
            Return:
    1 : Succeed
                > 1 : Error Codes
Converting Scanned Images to PNG's
    .       DWORD WINAPI ProofBuddyTiffToPNGs(LPTSTR szTiffName, LPTSTR
            szTiffPath, LPTSTR szPNGName, LPTSTR szPngPath)
API structures and functions provided by the client side
readDocumentInfo
        long readDocumentInfo(
            char *DocumentName,
            DocumentInfo *DocInfo);
        Input:
            char *DocuemntName: The document name
        Output:
            DocumentInfo *DocInfo (See 2.2.1 Documentation Information on the client
        side's design specification)
        Return:
            Success (1) or error (0).
    ii. writeDocumentInfo
        long writeDocumentInfo(
            char *DocumentName,
            DocumentInfo *DocInfo);
        Input:
            char *DocuemtnName: The document name
            DocumentInfo *DocInfo
        Return:
            Success (1) or error (0).
    iii. readPageInfo
        long readDocumentInfo(
            char *DocumentName,
            int Page,
            PageInfo *PageInfo);
        Input:
            char *DocuemntName: The document name
            int Page: The page of the document
        Output:
            PageInfo *PageInfo (See 2.2.1 Documentation Information on the client side's
        design specification)
        Return:
            Success (1) or error (0).
    iv. writePageInfo
        long writeDocumentInfo(
            char *DocumentName,
            int Page,
            PageInfo *PageInfo);
        Input:
            char *DocuemtnName: The document name
            int Page: The page of the document
            PageInfo *PageInfo
        Return:
            Success (1) or error (0).
    v.  getPath
        char *getPath(char *sUserName, char *sFolderType)
            Takes the username and the folder type as input and return the path for the user
            accordingly.
        Input:
            char *sUserName: The username
            char *sFolderType: The folder type (Private, Public, Admin).
                Default is public.
```

-continued

```
    Return:
        The path
vi. validateUser
    int validateUser(char *sUserName, char *sPassword)
        Takes the username and the password (not encrypted) as input. It returns 1
        (valid) and 0 (not valid) as output.
    Input:
        char *sUsername: The username
        char *sPassword: The password (un-encrypted)
    Return:
        valid (1) or not valid (0)
```

Documents Stored on Proof Buddy

Referring to FIG. 23, the documentation is stored in PNG (Portable Network Graphics) in Proof Buddy Storage. To display image files fast on the web browser, we prepare one file for each view mode (Thumbnail, Readable, Full Page) plus the original and each page.

```
Original:                filename_#.png
Full Size (400X?):       filename_f_#.png
Readable Size (800X?):   filename_r_#.png
Thumbnail (120X?):       filename_t_#.png
```

\# Represents page number

The height could be different depending on the aspect.

Documentation Information

Also, the controller creates an additional document information file in XML.

filename.xml

For example, sc2_scan.xml may contain the following information. The printing settings are saved when the client printer driver sends the print job into the proof buddy storage. The print.jsp loads the original setting the user sent to the Proof Buddy storage.

```
Document Information
    FileName=sc2_scan
    FileFormat=PNG
    TotalPage=7
    FileSize=2100530
    ResolutionWidth=600
    ResolutionHeight=600
    ImageSizeWidth=4928
    ImageSizeHeight=6400
    Created="01/29/2001 18:33:53"        (MM/DD/YYYY HH:MM:SS)
    Modified="01/29/2001 18:33:53"       (MM/DD/YYYY HH:MM:SS)
    NumCopies=1
    BindingEdge=0          (0=Short edge, 1=Long edge)
    Duplex=0               (0=Single side, 1=Book, 2=Tablet)
    DuplexId=0
    Stapling=0             (1=staple, 2,... (other positions), corresponding to PJL
                           comment value
    HolePunch=0            (0-4, corresponding to PJL comment value)
    Finishing=0            (0=Sort, 1=Group (Collated, Uncollated))
    InputBin=0
        (AUTO_TRAY = 0,
        BYPASS=1,
        UPPER=2,
        LOWER=3,
        PFP1=4,
        PFP2=5)
    ExitBin=1              (Tray 1 to 20)
    PrivatePin="12345"     (Pin for Private print job)
    Scheduled="01/29/2001 18:33:53"      (MM/DD/YYYY HH:MM:SS)
    DepartmentCode="12345"
Page Information
    Page=1
    PageSize=283478
    PaperSize=0
        (LETTER       = 0,
        LEGAL         = 1,
        A4            = 2,
        EXECUTIVE     = 3,
        STATEMENT     = 4,
        A3            = 5,
        B4            = 6,
        B5            = 7,
        LEDGER        = 8,
```

-continued

```
     COMPUTER    = 9,
     FOLIO       = 10,
     UNIVERSAL   = 11,
     A5          = 12,
     A6          = 13,
     AUTO        = 14,
     LETTER_R    = 15,
     A4_R        = 16,
     A5_R        = 17,
     B5_R        = 18,
     LEGAL13     = 19,
     8_5SQ       = 20)
FeedRotation=0      (0=Portrait, 1= Landscape)
```

The User Database is located on the controller and contains the fields as shown in FIG. 24. Note that the fields can increase later if more information needs to be stored.

The fields are stored in CSV format. The fields are encased in double quotations and separated by comma. This gives the flexibility that the fields are not restricted to have a maximum length hard coded in the database and can be changed according to the requirement.

The database file will have a 'NoOfFields' value in the $1^{st}$ line of the file, which will indicate the number of fields in the database.

The $2^{nd}$ line will contain the name of the fields separated by comma.

It will help in identifying the fields and their name(s). This gives the flexibility that one can add another field later on without affecting the code and with minimum change.

In addition to the user database, a system database is located on the controller to keep the drive information where documentation data is located.

FIG. 3 shows the client/web server application diagram as contemplated by the present invention. There are 3 layer components in the web server/client program: The top is the UI layer (written in JSP), the second is the middleware engine to communicate between UI and data or native program or data (written in JavaBeans), and the bottom layer is a native module to communicate with the controller (most likely written in C).

Tomcat (JSP engine) listens on port 8080 for incoming HTTP requests and this avoids a conflict with the standard HTTP (port 80) requests.

The Printer driver creates the following additional PJL comments to specify the Proof Buddy Job DSSC PRINT PRINTMODE="PROOFBUDDY"
DSSC PRINT PROOFBUDDYFOLDER="PRIVATE" (or "PUBLIC")
DSSC PRINT PROOFBUDDYUSERNAME="katie"
DSSC PRINT PROOFBUDDYPASSWORD="xxxxx" (encrypted)
DSSC PRINT PROOFBUDDYFILENAME="test"

The printer driver checks the user database to authenticate the user name and the password matches using database package.

The file name that the user specified in the printer driver dialog, the controller creates the filename as following scheme.

```
[Public folder is specified]
    filename_username_MMDDYY_HHMMSS
[Private folder is specified]
    filename_MMDDYY_HHMMSS
```

The controller creates the document files and additional document information file as previously defined.

As described previously section, there are 3 layer components in the web server/client program. The top is the user interface (UI) layer (written in JSP), the second is the middleware engine to communicate between UI and data or native program or data (written in JavaBeans), and the bottom layer is a set of native modules to communicate with the controller (most likely written in C).

The Explorer JavaBeans generates the display of the folder and the document in the folder. The explorer is designed so that the user's private folder, the admin folder and the public folder can be located in physically different drives or partitions. This helps in overcoming the space limitation. If a particular drive becomes full then a different drive can be used for storage. At the time of user creation the administrator can specify where to set the user's folder. The physical drive will be mapped logically and shown to the user.

Trim, Negative/Positive, Mirror, Rotate, Flip, Shear editing functions are accomplished by LeadTools Raster Image Engine and the JNI (Java Native Interface) method is used to access this engine. When view.jsp requests any of the above editing functions, LeadWrap JavaBean class is called and then this class calls the native DLL, LeadWrap.dll. And then this DLL calls LeadTools Raster Image Engine to perform the editing function and then save the result as a PNG file under the temporary directory. All temporary PNG files will be deleted when a new session is opened along with undo buffer.

LeadWrap Class
private native long loadBitmap(String fileName);
private native long saveBitmap(long bmpHandle, String fileName, int bitsPixel);
private native long freeBitmap(long bmpHandle);
private native long getFileInfo(String fileName);
private native float getInfoWidth(String fileName);
private native float getInfoHeight(String fileName);
private native float getInfoXRes(String fileName);
private native float getInfoYRes(String filename);
private native float getInfoBits(String fileName);
private native String getInfoCompress(String fileName);
private native float getInfoPage(String filename);
private native float getInfoFormat(String fileName);
private native float getInfoSizeDisk(String fileName);
private native float getInfoSizeMem(String fileName);
private native long mirrorBitmap(long bmpHandle);
private native long flipBitmap(long bmpHandle);
private native long rotateBitmap(long bmpHandle, int rotAngle);
private native long invertBitmap(long bmpHandle);

```
private native long shearBitmap(long bmpHandle, int
    shearAngle);
private native long trimBitmap(long bmpHandle,
    float trimLeft, float trimTop, float newWidth, float
    newHeight);
private native long autotrimBitmap(long bmpHandle, int
    threshold);

LeadWrap.dll
    JNIEXPORT jlong JNICALL Java_imgconv_LeadWrap_
        loadBitmap (JNIEnv*, jobject, jstring);
    JNIEXPORT jlong JNICALL Java_imgconv_LeadWrap_
        saveBitmap (JNIEnv*, jobject, jlong, jstring, jint);
    JNIEXPORT jlong JNICALL Java_imgconv_LeadWrap_
        freeBitmap (JNIEnv*, jobject, jlong);
    JNIEXPORT jlong JNICALL Java_imgconv_Lead-
        Wrap_getFileInfo (JNIEnv*, jobject, jstring);
    JNIEXPORT jfloat JNICALL Java_imgconv_Lead-
        Wrap_getInfoWidth (JNIEnv*, jobject, jstring);
    JNIEXPORT jfloat JNICALL Java_imgconv_Lead-
        Wrap_getInfoHeight (JNIEnv*, jobject, jstring);
    JNIEXPORT jfloat JNICALL Java_imgconv_Lead-
        Wrap_getInfoXRes (JNIEnv*, jobject, jstring);
    JNIEXPORT j float JNICALL Java_imgconv_Lead-
        Wrap_getInfoYRes (JNIEnv*, jobject, jstring);
    JNIEXPORT jfloat JNICALL Java_imgconv_Lead-
        Wrap_getInfoBits (JNIEnv*, jobject, jstring);
    JNIEXPORT j string JNICALL Java_imgconv_Lead-
        Wrap_getInfoCompress (JNIEnv*, jobject, jstring);
    JNIEXPORT jfloat JNICALL Java_imgconv_Lead-
        Wrap_getInfoPage (JNIEnv*, jobject, jstring);
    JNIEXPORT jfloat JNICALL Java_imgconv_Lead-
        Wrap_getInfoFormat (JNIEnv*, jobject, jstring);
    JNIEXPORT jfloat JNICALL Java_imgconv_Lead-
        Wrap_getInfoSizeDisk (JNIEnv*, jobject, jstring);
    JNIEXPORT jfloat JNICALL Java_imgconv_Lead-
        Wrap_getInfoSizeMem (JNIEnv*, jobject, jstring);
    JNIEXPORT jlong JNICALL Java_imgconv_LeadWrap_
        mirrorBitmap (JNIEnv*, jobject, jlong);
    JNIEXPORT jlong JNICALL Java_imgconv_LeadWrap_
        flipBitmap (JNIEnv*, jobject, jlong);
    JNIEXPORT jlong JNICALL Java_imgconv_LeadWrap_
        rotateBitmap (JNIEnv*, jobject, jlong, jint);
    JNIEXPORT jlong JNICALL Java_imgconv_LeadWrap_
        invertBitmap (JNIEnv*, jobject, jlong);
    JNIEXPORT jlong JNICALL Java_imgconv_LeadWrap_
        shearBitmap (JNIEnv*, jobject, jlong, jint);
    JNIEXPORT jlong JNICALL Java_imgconv_LeadWrap_
        trimBitmap (JNIEnv*, jobject, jlong, jfloat, jfloat,
        jfloat, jfloat);
    JNIEXPORT jlong JNICALL Java_imgconv_LeadWrap_
        autotrimBitmap (JNIEnv*, jobject, jlong, jint);

The following functions are provided for the controller side:
```

```
Document Information API
readDocumentInfo
    long readDocumentInfo(
        char *DocumentName,
        DocumentInfo *DocInfo);
    Input:
        char *DocuemntName: The document name
    Output:
        DocumentInfo *DocInfo (See 2.2.1 Documentation Information)
    Return:
        Success (1) or error (0).
writeDocumentInfo
    long writeDocumentInfo(
        char *DocumentName,
        DocumentInfo *DocInfo);
    Input:
        char *DocuemtnName: The document name
        DocumentInfo *DocInfo (See 2.2.1 Documentation Information)
    Return:
        Success (1) or error (0).
readPageInfo
    long readDocumentInfo(
        char *DocumentName,
        int Page,
        PageInfo *PageInfo);
    Input:
        char *DocuemntName: The document name
        int Page: The page of the document
    Output:
        PageInfo *PageInfo (See 2.2.1 Documentation Information)
    Return:
        Success (1) or error (0).
writePageInfo
    long writeDocumentInfo(
        char *DocumentName,
        int Page,
        PageInfo *PageInfo);
    Input:
        char *DocuemtnName: The document name
        int Page: The page of the document
        PageInfo *PageInfo (See 2.2.1 Documentation Information)
    Return:
        Success (1) or error (0).
User Database API
getPath
```

-continued

```
    char *getPath(char *sUserName, char *sFolderType)
        Takes the username and the folder type as input and return the path for the user
        accordingly.
    Input:
        char *sUserName: The username
        char *sFolderType: The folder type (Private, Public, Admin).
                        Default is public.
    Return:
        The path
validateUser
    int validateUser(char *sUserName, char *sPassword)
        Takes the username and the password (not encrypted) as input. It returns 1
        (valid) and 0 (not valid) as output.
    Input:
        char *sUsername: The username
        char *sPassword: The password (un-encrypted)
    Return:
        valid (1) or not valid (0)
```

Figure 9:
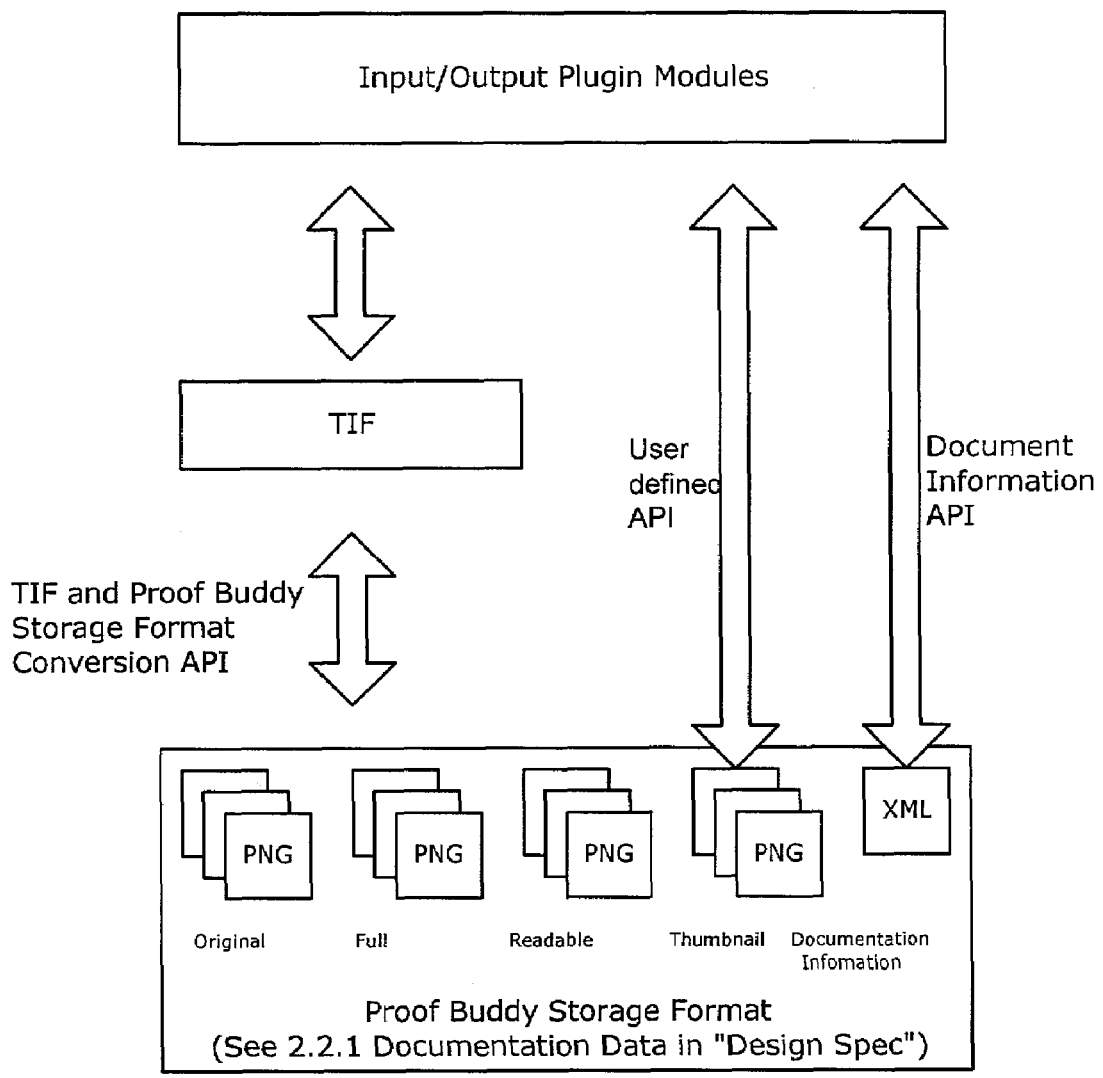
FIG. 9 is a block diagram showing the documentation data I/O as contemplated by the present invention.

FIG. 9 shows the "Proof Buddy" Documentation Data I/O. The proofing system standard APIs so that other input/output modules can be plug-in into the proofing system easily. There are two ways to store/retrieve the documentation image data:

1. Use APIs to convert between TIF format and the "Proof Buddy" documentation format provided by the proofing system.

2. Read/Save the "Proof Buddy" documentation data directly (User defined API) and use the documentation information APIs to R/W the documentation attributes information. (i.e. paper size, . . . etc.)

The present proofing system is a web-based application that allows end-users, administrators and service engineers to set up, use and maintain the proofing system. The proofing system can be designed and built to be localized in the following languages: U.S. English, U.K English, French, German, Swedish, Norwegian, Finnish, Danish, Dutch, Spanish, Italian, Czech, Polish, and Japanese. The proofing system Proof Buddy works with the following browsers:

Microsoft Internet Explorer Version 5.0 or later for Microsoft Windows

Microsoft Internet Explorer Version 5.0 or later for Mac and Unix (Version 5.x supports pop-up windows)

Netscape Navigator Version 4.7 or later for Windows

Netscape Navigator Version 4.7 or later for Mac and Unix

The minimum display resolution required for the above browsers is 800×600.

The proofing system web server requires Microsoft IIS running on Windows NT 4.0, Tomcat Version 3.2 (combined engine of JSP 1.1 and Servlet 2.2), and Java 2 Runtime Environment, Standard Edition including Java Plug-in, (Currently using Version 1.3.0).

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

We claim:

1. A networked document processor system comprising:

means adapted for receiving from at least one thin client interface, via an associated network, request data representative of a selected document processing operation on at least one selected electronic document on a selected document processing device;

display generator means adapted for generating display data on an associated thin client interface representative of an image of each of a plurality of pages associated with the each selected electronic document;

means adapted for communicating the display data, via the associated network, to the display generator means so as to concurrently generate a plurality of images corresponding to the plurality of pages associated with the display data on the thin client interface associated therewith;

means adapted for receiving, via the at least one thin client interface, selection data representative of selected pages from each selected electronic document from the plurality thereof displayed on the thin client interface such that individual pages specified from within each electronic document are selectable via the thin client interface;

means adapted for receiving, via the at least one thin client interface, page ordering data representative of an ordering of selected pages;

means adapted for receiving, via the thin client interface, output instructions relative to the selected pages in accordance with received selection data and received ordering data; and means adapted for commencing the selected document processing operation on the selected pages in accordance with the output instructions.

2. The networked document processor system of claim 1 wherein the document output operation includes at least one of a facsimile transmission, storage operation, and print operation.

3. The networked document processor system of claim 2 wherein the output instructions further include instructions to complete at least one of a storage operation, view operation, print operation, split operation, merge operation, and facsimile transmission of the selected electronic document.

4. The networked document processor system of claim 2 wherein the display generator means further includes means adapted for generating secondary display data corresponding to the output instructions.

5. The networked document processor system of claim 4 wherein the display data is displayed as at least one of thumbnail view, full page view, file list view, and a readable size view.

6. The networked document processor system of claim 2 further comprising:

means adapted for prompting an associated user for user identification data;

means adapted for receiving user identification data from the associated user;

validation means adapted for validating the received user identification data; and means adapted for controlling access to the networked document processor system in accordance with the validation of the received user identification data.

7. The networked document processor system of claim 6 further comprising selective access control means adapted for selectively controlling access to the networked document processor system for each associated user.

8. The networked document processor system of claim 7 wherein the means adapted for selectively controlling access further comprise means adapted for receiving selected access parameters for each associated user, via a user interface, from an associated administrator.

9. A method for networked document processing comprising the steps of:

Receiving from at least one thin client interface, via an associated network, request data representative of a selected document processing operation on a selected electronic document on at least one selected document processing device;

generating display data on an associated thin client interface representative of an image of each of the plurality of pages associated with each selected electronic document;

communicating the display data, via the associated network, to the associated thin client interface so as to concurrently generate a plurality of images corresponding to the plurality of pages associated with the display data thereon;

receiving, via the at least one thin client interface, selection data representative of selected pages from each selected electronic document from the plurality displayed on the thin client interface such that individual pages specified from within each electronic document are selectable via the thin client interface;

receiving, via the thin client interface, output instructions relative to the selected pages in accordance with received data and received ordering data; and commencing the selected document processing operation on the selected pages in accordance with the output instructions.

10. The method for networked document processing of claim 9 wherein the document output operation includes at least one of a facsimile transmission, storage operation, and print operation.

11. The method for networked document processing of claim 10 wherein the output instructions further include instructions to complete at least one of a storage operation, view operation, print operation, split operation, merge operation, and facsimile transmission of the selected electronic document.

12. The method for networked document processing of claim 10 further comprising the step of generating secondary display data corresponding to the output instructions.

13. The method for networked document processing of claim 12 wherein the display data is displayed as at least one of thumbnail view, full page view, file list view, and a readable size view.

14. The method for networked document processing of claim 10 further comprising the steps:

prompting an associated user for user identification data;

receiving user identification data from the associated user;

validating the received user identification data; and controlling access to a networked document processor system in accordance with the validation of the received user identification data.

15. The method for networked document processing of claim 14 further comprising the step of selectively controlling access to the networked document processor system for each associated user.

16. The method for networked document processing of claim 15 wherein step of selectively controlling access further the step of receiving selected access parameters for each associated user, via a user interface, from an associated administrator.

* * * * *